United States Patent [19]

Rendin

[11] 4,150,528
[45] Apr. 24, 1979

[54] ADJUSTABLE TINE RAKE

[76] Inventor: Larry Rendin, 508 N. Swarthmore Ave., Swarthmore, Pa. 19081

[21] Appl. No.: 828,022

[22] Filed: Aug. 26, 1977

[51] Int. Cl.² ............................................. A01D 7/04
[52] U.S. Cl. .............................. 56/400.19; 56/400.16; 56/400.18
[58] Field of Search ........... 56/400.16, 400.17, 400.18, 56/400.19, 400.2, 400.12

[56] References Cited

U.S. PATENT DOCUMENTS

| | | | |
|---|---|---|---|
| 484,156 | 10/1892 | Koonce | 56/400.17 |
| 1,149,098 | 8/1915 | Tanaka | 56/400.18 |
| 1,172,981 | 2/1916 | Gorman | 56/400.16 |
| 1,657,322 | 1/1928 | Shinn | 56/400.19 |
| 1,663,395 | 3/1928 | Tanaka | 56/400.18 |
| 1,785,320 | 12/1930 | Lorber | 56/400.18 |
| 1,904,843 | 4/1933 | Withington | 56/400.18 |
| 1,942,629 | 1/1934 | Withington | 56/400.17 |
| 2,149,429 | 3/1939 | Finkes | 56/400.18 |
| 2,705,394 | 4/1955 | Steensen | 56/400.17 |
| 2,794,312 | 6/1957 | Finkes | 56/400.17 |
| 3,804,451 | 4/1974 | Burke | 56/400.18 |
| 3,838,474 | 10/1974 | Erickson | 56/400.16 |

*Primary Examiner*—Louis G. Mancene
*Assistant Examiner*—Paul J. Hirsch
*Attorney, Agent, or Firm*—J. L. Jones

[57] ABSTRACT

A gardening rake useful for raking leaves, garden refuse and the like, has a pair of parallel rows of rake tines disposed in a U-channel rake header. The pair of parallel rows of rake tines are formed of multiple tine pairs of spring metal strips formed in a U-shape, and secured at the tine pair U-base to a single common tine frame support. The tine frame support has a handle means useful for adjusting and adapting the length of the flexible spring metal tines to the desired overall spring stiffness for a specific raking operation.

2 Claims, 2 Drawing Figures

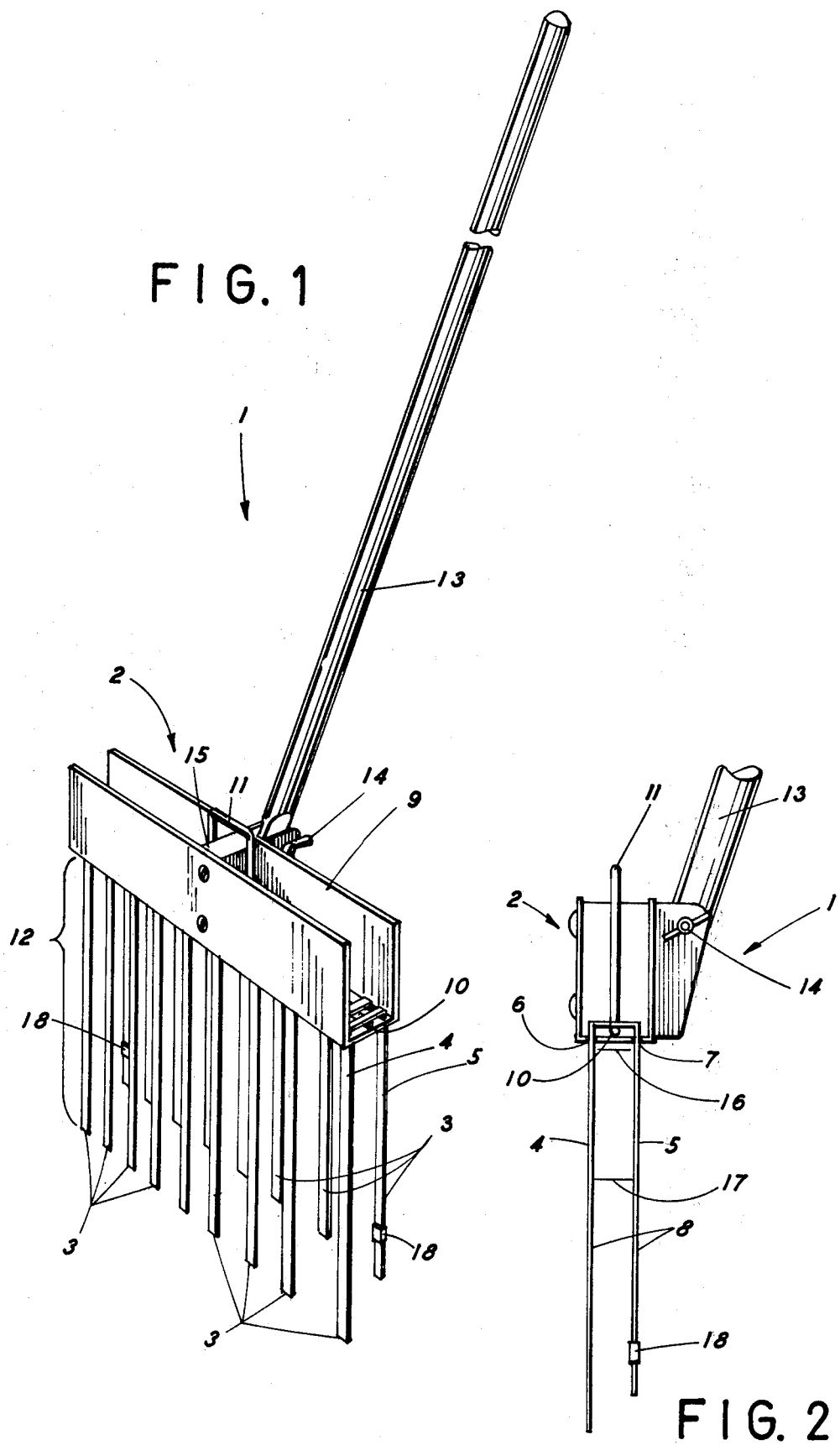

ADJUSTABLE TINE RAKE

BACKGROUND OF THE INVENTION

The multiple blade rake of this invention is classified in Class 56/400.16, 56/400.12, 56/400.17, and the like.

In U.S. Pat. No. 3,264,810 issued Aug. 9, 1966, Lowell discloses a rake having flexible tines of fixed disposition and a comb unit, providing collection of light and bulky articles, such as leaves, and small and compact articles, such as twigs and acorns. Spondie et al, in U.S. Pat. No. 2,900,781 issued Aug. 25, 1959, discloses a convertible yard tool which can be used as a rake, and then converted into a pitchfork type shovel tool. In U.S. Pat. No. 2,504,943, issued Apr. 18, 1950, Zifferer discloses a pickup rake which has a first aligned row of rake tines secured in a fixed head, and a second head of aligned tines swingingly mounted with respect to the first set of tines. Leaf piles can be clamped between the first and second set of tines for a pick up and deposit operation. In U.S. Pat. No. 1,191,911 issued July 18, 1916, Ritchie disclosed a rake having two aligned rows of tines alternately aligned in two rows.

SUMMARY OF THE INVENTION

A multiple tine rake has a rake head with multiple rake blades or tines. The multiple rake tines are disposed in a pair of parallel rows of rake tines. The pair of parallel rows of tines are formed of multiple tine pairs of single spring metal strips formed in a U-hairpin shape. Each one of the multiple U-hairpin tines are disposed in a pair of opposed slots in the U-channel rake header. Each one of the multiple pairs of tines are secured to a single common tine support frame. The tine frame support has a handle means useful for raising and lowering the tine length disposed below the U-channel rake header, adjusting and adapting the flexible spring metal tines for a specific raking operation requiring a specific tine stiffness.

Included in the objects of this invention are:

To provide a multipe tine rake which can be adjusted in tine stiffness for a specific raking operation.

To provide a multiple tine rake in which the rake tines can be replaced after wear and tear.

Other objects and advantages of this invention are taught in the following description and claims.

BRIEF DESCRIPTION OF THE DRAWINGS

The description of this invention is to be read in conjunction with the following drawings:

FIG. 1 is an elevational perspective view of the multiple tine rake of this invention.

FIG. 2 is a sectional view through 2—2 of FIG. 1.

DESCRIPTION OF THE PREFERRED EMBODIMENT OF THE INVENTION

A gardening rake useful for raking leaves and other garden tasks is illustrated in detail in FIGS. 1 and 2. The multiple tine rake 1 has a rake head 2 in which are disposed and secured the multiple rake tines 3. There is a first aligned row of tines 4 and a second aligned row of tines 5, each row comprising multiple tines. The multiple tines 3 are narrow spring metal strips. A single spring metal strip is formed into a U-hairpin providing the paired two tines 4 and 5 in opposition, as shown in FIG. 2, forming the tine pair 8. Multiple paired tine U-hairpins 8 are disposed in multiple pairs of opposed slots 6 and 7 in the rake U-channel rake header 9. The multiple pairs of opposed slot 6 and 7 are disposed in an aligned pair of opposed slot rows, wherein the multiple slots 6 are spaced a required distance apart, as are the multiple slots 7. Thus two aligned sets of spaced slot rows are provide in the header 9 base.

A single tine frame support 10 is disposed along and permanently secured by conventional means, such as spot welding, peening or the like, to all the multiple pairs of tines 8, which are disposed in two aligned rows 4 and 5 of multiple tines in header 9. The handle means 11 formed in the tine frame support 10 is adapted to pull the multiple tine pairs 8 up or push them down as is required to adapt the tine length 12 below the header 9 to a specified value of stiffness for the required gardening task.

The multiple tine pairs 8 are secured at a specific tine length 12 by adapting and adjusting the width 16 between the pair of opposed slots 6 and 7 to provide a spring pressure loading on the tine pair 8, and also be adapting the width 17 between the tines 4 and 5. Thus the spring pressure of tine pair 8 on slots 6 and 7 retain the tine length 12 at a required value.

A conventional rake handle means 13 is secured to the U-channel header 9 by a fastener means 14, which is secured in a second channel means 15 disposed and secured centrally normal to the U-channel header 9, as by conventional spot welding, screws, or the like. Plural tine stops 18 are permanently secured as clips on plural tines to prevent the multiple tines 3 from being pulled out of the header 9.

Operationally, the multiple tine rake 1 can be adjusted for stiffness in a specific raking operation by pulling up or pushing down the handle 11, to provide a required tine length 12, adjusting the collective tine stiffness.

The complete set of multiple tine pairs 8 secured on a single tine frame support 10, when worn or broken, can be replaced by a new set of 8 combined with 10, utilizing the old header 9 and the remaining old rake components.

Many modifications in the multiple tine rake can be made in the light of my teachings. It is understood that within the scope of the claims, the invention can be practiced otherwise than as described.

I claim:

1. An adjustable tine rake combination comprising:
   a U-channel rake header having a required length, said header having a multiplicity of opposed aligned pairs of slots disposed in two longitudinal aligned rows along the header base, said pairs of slots disposed at specified distances along said two rows,
   a multiplicity of paired opposed tines having a U-hairpin configuration, each one of said multiplicity of paired opposed tines disposed in each one of said multiplicity of opposed pairs of slots disposed in said two rows along said header base, said paired opposed tines being formed of narrow strips of spring steel, each one of said paired opposed tines providing spring pressure loading to the opposed pair of slots in which said paired tines are disposed,
   a single tine frame support disposed along and permanently secured to all the multiple tines at the U-bend of the paired opposed tines, said frame support having a support handle suitable for regulating the relative position of said frame support and said rake header, said support handle centrally disposed in said frame support, and,
a rake handle secured to said rake header, said rake handle centrally disposed along said header length, normal to said header length,
whereby, said tine support frame can be utilized to adjust said multiplicity of tines for stiffness by adapting the length of said tines disposed below said rake header.

2. In the combination set forth in claim 1, the further modification wherein at least one stop is mechanically secured on at least one tine below said rake header.

* * * * *